United States Patent
Yoshida (10) Patent No.: US 10,449,860 B2
(45) Date of Patent: Oct. 22, 2019

(54) COOLING APPARATUS

(71) Applicant: TOYOTA JIDOSHA KABUSHIKI KAISHA, Toyota-shi, Aichi (JP)

(72) Inventor: Shiro Yoshida, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/123,179

(22) Filed: Sep. 6, 2018

(65) Prior Publication Data
US 2019/0126755 A1    May 2, 2019

(30) Foreign Application Priority Data
Oct. 26, 2017 (JP) .................. 2017-207621

(51) Int. Cl.
| F01P 7/00 | (2006.01) |
| F01P 5/14 | (2006.01) |
| B60L 3/00 | (2019.01) |
| B60K 11/04 | (2006.01) |
| B60W 20/50 | (2016.01) |

(Continued)

(52) U.S. Cl.
CPC ............ B60L 3/0023 (2013.01); B60K 11/02 (2013.01); B60K 11/04 (2013.01); B60W 10/30 (2013.01); B60W 20/50 (2013.01); F01P 5/14 (2013.01); F01P 7/00 (2013.01); B60K 2001/003 (2013.01); B60L 2240/445 (2013.01); F01P 2025/66 (2013.01)

(58) Field of Classification Search
CPC .............. B60L 3/0023; B60L 2240/10; B60L 2240/461; B60K 11/04; B60W 20/50; B60W 10/30; F01P 7/00; F01P 7/04; F01P 2037/00; F01P 2025/66; F01P 5/14; F01P 2031/36
See application file for complete search history.

(56) References Cited

U.S. PATENT DOCUMENTS

| 5,724,924 A | * | 3/1998 | Michels | ............... F01P 7/044 123/41.12 |
| 2011/0246007 A1 | * | 10/2011 | Choi | ............... B60H 1/00885 701/22 |
| 2014/0262195 A1 | * | 9/2014 | Lee | ............... B60W 10/08 165/200 |

FOREIGN PATENT DOCUMENTS

| JP | 2011-160597 A | 8/2011 |
| JP | 2013-038990 A | 2/2013 |

* cited by examiner

*Primary Examiner* — Jacob M Amick
(74) *Attorney, Agent, or Firm* — Oliff PLC (57) ABSTRACT

A cooling apparatus may be configured to cool a device mounted in a vehicle. The cooling apparatus may include: a pump configured to circulate a refrigerant between the device and a radiator, and a controller configured to provide an output command value to the pump, and to monitor occurrence of abnormality of the pump. The controller may be configured capable of executing: vehicle-speed-based control including shifting the output command value when a vehicle speed falls below a predetermined vehicle speed threshold value; and monitoring control including: measuring an abnormality duration time during which a rotational speed of the pump is deviating from a predetermined allowable range; and outputting a notification signal notifying the abnormality of the pump when the measured abnormality duration time exceeds a predetermined time threshold value. While the controller is measuring the abnormality duration time in the monitoring control, the controller may inhibit the vehicle-speed-based control.

2 Claims, 6 Drawing Sheets

(51) Int. Cl.
   *B60W 10/30*   (2006.01)
   *B60K 11/02*   (2006.01)
   *B60K 1/00*   (2006.01)

COOLING APPARATUS

CROSS-REFERENCE

This application claims priority to Japanese Patent Application No. 2017-207621 filed on Oct. 26, 2017, the entire contents of which are incorporated herein by reference.

TECHNICAL FIELD

The technique disclosed herein relates to a cooling apparatus configured to cool a device mounted on a vehicle.

BACKGROUND ART

A fuel cell vehicle and an electric vehicle each have a high-power device for controlling an electric traction motor installed therein. The high-power device may for example be a power converter configured to convert power from a power source to driving power for the traction motor. Since the high-power device generates a large heat quantity, the vehicle is provided with a cooling apparatus for cooling a device having such a large heat quantity. Since a fuel cell also generates a large heat quantity, it is provided with a cooling apparatus. The cooling apparatus is configured to pump a refrigerant to the device (including the fuel cell) using a pump. For convenience, "an electric traction motor" may be called as "a traction motor" hereinafter.

On the other hand, the vehicle which runs on the traction motor exhibits superior quietness, so an operation sound of the pump may become a noise while running at a low speed. Thus, for example, a cooling apparatus described in JP 2013-38990 A sets a rotational speed of a pump so that a resonant frequency of a vehicle body and a vibration frequency of the pump do not match. A cooling apparatus described in JP 2011-160597 A lowers an output command value for a pump in a case where a vehicle speed is lower than a vehicle speed threshold value so that a vibration frequency of the pump does not match a resonant frequency of a vehicle body.

SUMMARY

When an output command value of a pump is shifted discretely (in steps) according to a vehicle speed, a rotational speed of the pump temporarily fluctuates until the rotational speed shifted from its previous output command value is stabilized at a new output command value. On the other hand, a controller of a cooling apparatus monitors the rotational speed of the pump, and in a case where the rotational speed deviates from an allowable range over a certain period of time, the controller outputs a signal notifying an abnormality in the pump. If the controller shifts the output command value discretely while the rotational speed is deviating from the allowable range, the rotational speed may accidentally temporarily enter the allowable range due to fluctuation of the rotational speed caused by the output command value shifting. When the rotational speed enters the allowable range, the controller resets a measurement of a time during which the rotational speed is deviating from the allowable range. The disclosure herein provides a technique which provides a solution to a conflict between a pump control according to a vehicle speed which aims to maintain quietness and a control for monitoring an abnormality in the pump.

A cooling apparatus disclosed herein may comprise a pump configured to circulate a refrigerant between a device mounted on a vehicle and a radiator, and a controller. The controller may be configured to provide an output command value to the pump, and to monitor occurrence of abnormality of the pump. The controller may be configured capable of executing a vehicle-speed-based control including shifting the output command value by a predetermined value when a vehicle speed falls below a predetermined vehicle speed threshold value. By shifting the output command value by the predetermined value, a resonant frequency can be avoided so that a pump noise can be refrained from becoming large. On the other hand, the controller may be configured capable of executing monitoring control including: measuring an abnormality duration time during which a rotational speed of the pump is deviating from a predetermined allowable range; and outputting a notification signal notifying the abnormality of the pump when the measured abnormality duration time exceeds a predetermined time threshold value. Further, while the controller is measuring the abnormality duration time in the monitoring control, the controller may inhibit the vehicle-speed-based control. This cooling apparatus does not shift the output command value to the pump even if the vehicle speed crosses over the vehicle speed threshold value during when the rotational speed of the pump exceeds the allowable range, and as such, fluctuation of the rotational speed caused by output command value shifting does not occur. Due to this, a situation in which the abnormality duration time is reset by error can be avoided from occurring.

Further, the controller may be configured to temporarily stop the monitoring control during a predetermined period of time since the output command value has been shifted by a predetermined value in the vehicle-speed-based control. If an output target value is discretely shifted by the vehicle-speed-based control during when the rotational speed of the pump is within the allowable range, there is a risk that the temporal fluctuation of the rotational speed might cause the rotational speed to deviate from the allowable range temporarily. In this case, the controller would start the measurement of the abnormality duration time despite the pump being normal. By temporarily stopping the monitoring control during the predetermined period of time after having discretely shifted the output target value, the fluctuation of the rotational speed caused by the output target value shifting can be avoided from being erroneously determined as an abnormality.

Details and further improvements disclosed herein will be described in the Detailed Description below.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved cooling apparatuses, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
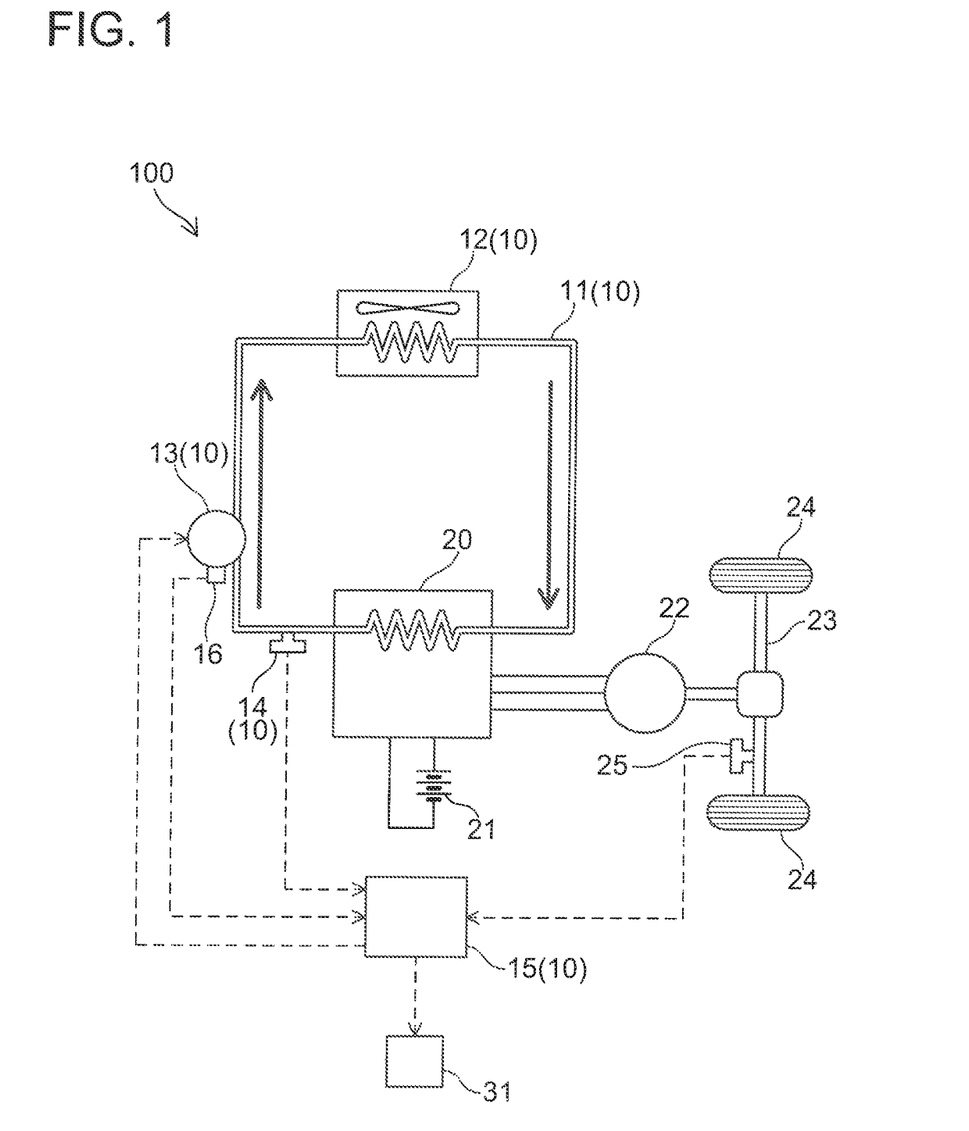
FIG. 1 is a block diagram of a drive system of an electric vehicle including a cooling apparatus of an embodiment.

A cooling apparatus 10 of an embodiment will be described with reference to the drawings. The cooling apparatus 10 is mounted on an electric vehicle 100. FIG. 1 shows a block diagram of a drive system of the electric vehicle 100 including the cooling apparatus 10. The cooling apparatus 10 of the embodiment is configured to cool an inverter 20. The inverter 20 is configured to convert DC power from a vehicle-mounted battery 21 to AC power and supply the same to a traction motor 22. Output torque of the traction motor 22 is transmitted to driving wheels 24 via an axle shaft 23. The axle shaft 23 is provided with a vehicle speed sensor 25 configured to measure a vehicle speed. Since the inverter 20 is capable of processing high power that is 10 kilowatts or more, its heat quantity generation is large. Due to this, the electric vehicle 100 is provided with the cooling apparatus 10 for cooling the inverter 20.

The cooling apparatus 10 includes a circulation passage 11, a radiator 12, a pump 13, a temperature sensor 14, and a controller 15. The circulation passage 11 is a passage of a refrigerant, and passes through the radiator 12 and the inverter 20. The pump 13 is configured to circulate the refrigerant between the radiator 12 and the inverter 20. The refrigerant is for example water or LLC (Long Life Coolant). The temperature sensor 14 is configured to measure a temperature of the refrigerant that had passed through the inverter 20. The controller 15 provides an output command value to the pump 13 based on the measured temperature from the temperature sensor 14. Solid bold lines in the drawing indicate a flowing direction of the refrigerant. Further, broken lines in the drawing are signal lines, by which the controller 15 is configured to receive sensor data from the temperature sensor 14 and the vehicle speed sensor 25 and send the output command value to the pump 13. The pump 13 is provided with a rotational speed sensor 16, and data of a rotational speed of the pump 13 is also sent to the controller 15. A predetermined signal is sent from the controller 15 to an instrument panel 31. The predetermined signal will be described later.

The pump 13 is an electrically driven pump in which the rotational speed is controlled by a duty ratio, and the output command value to the pump 13 is provided specifically in a form of the duty ratio. The pump 13 operates at high speed when the duty ratio is large.

Figure 2:
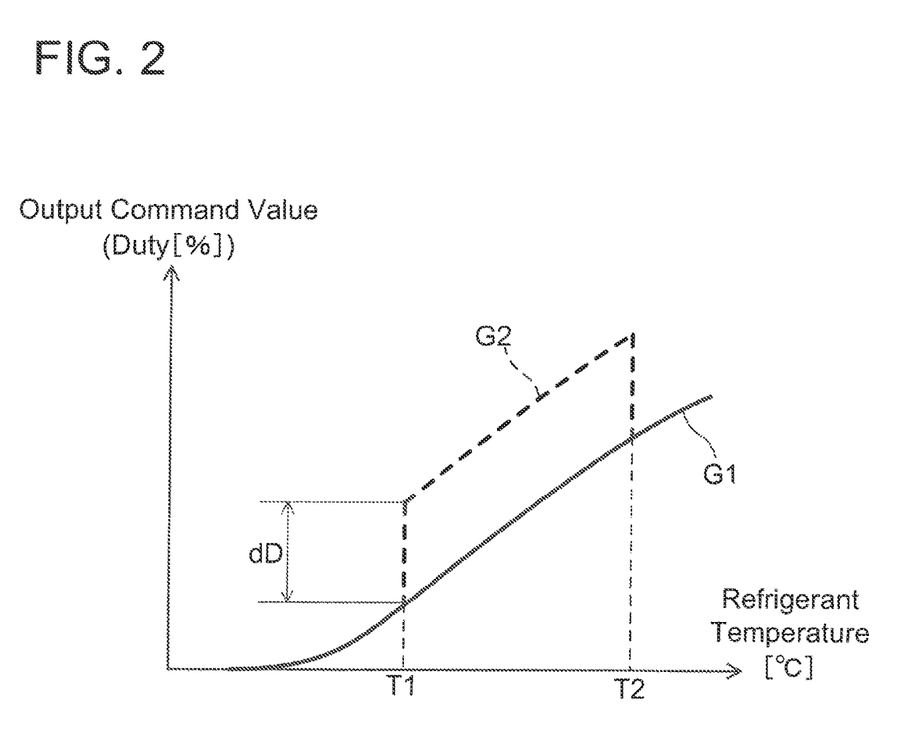
FIG. 2 is a graph showing a relationship between a refrigerant temperature, a vehicle speed, and an output command value.

The controller 15 is configured to determine the output command value to the pump 13 in accordance with a refrigerant temperature. The refrigerant temperature measured by the temperature sensor 14 reflects a temperature of the inverter 20. Thus, the controller 15 increases the output command value to a greater value for a higher refrigerant temperature. FIG. 2 shows a graph providing a relationship between the refrigerant temperature and the output command value. Since the output command value relates also with the vehicle speed, the graph of FIG. 2 also shows a relationship between the vehicle speed and the output command value. A graph G1 shows the relationship between the refrigerant temperature and the output command value during a normal mode. The output command value increases as the refrigerant temperature rises. The relationship of the graph G1 is stored in the controller 15 in advance, and the controller 15 determines the output command value corresponding to the refrigerant temperature based on the relationship of the graph G1.

A broken line graph G2 is a graph providing the relationship of the refrigerant temperature and the output command value to be employed when the vehicle speed falls below a vehicle speed threshold value Vth. When the vehicle speed falls below the vehicle speed threshold value Vth during when the refrigerant temperature is between a first temperature T1 and a second temperature T2, the controller 15 determines the output command value based on the relationship of the graph G2. The graph G2 is greater than the graph G1 by an offset dD in a range between the first temperature T1 and the second temperature T2. The relationship of the graph G2 is also stored in the controller 15 in advance. The relationships of the graphs G1 and G2 are stored in the controller 15 in functional formats or map formats (table formats).

For easier explanation, a pump control in which the controller 15 is configured to calculate the output command value from the relationship of the graph G01 will be termed a normal mode, and a pump control in which the controller 15 is configured to calculate the output command value from the relationship of the graph G2 will be termed a high-speed mode. Further, a control to switch between the normal mode and the high-speed mode according to the vehicle speed, that is, a control by which the output command value is discretely shifted by the offset dD when the vehicle speed falls below the predetermined vehicle speed threshold value Vth, will be termed a vehicle-speed-based control.

An aim of the vehicle-speed-based control will be described. The vehicle-speed-based control is executed for a purpose of suppressing pump noise. Since the electric vehicle 100 runs on the traction motor 22, it exhibits superior quietness. In a low-vehicle speed range where running noise becomes small, the pump noise becomes relatively prominent. Especially when a vibration frequency of the pump 13 matches a resonant frequency of a vehicle body, the pump noise is thereby increased, and a driver and/or passenger may feel discomfort from the noise. The vibration frequency of the pump 13 changes according to a rotational speed of the pump 13. Thus, the cooling apparatus 10 discretely shifts the output command value to the pump 13 in the low-vehicle speed range (<vehicle speed threshold value Vth) so that the vibration frequency of the pump 13 separates away from the resonant frequency of the vehicle body. Specifically, when the vehicle speed falls below the vehicle speed threshold value Vth, the controller 15 increases the output command value by a discrete quantity dD to increase the rotational speed of the pump 13. The pump noise becomes smaller with the vibration frequency of the pump 13 being separated away from the resonant frequency of the vehicle body. The relationship of the graph G1 of FIG. 2 is preferable in terms of properly maintaining the refrigerant temperature and suppressing power consumption, however, in the low-vehicle speed range, the relationship of the graph G2 that is preferable in terms of suppressing the pump noise is employed in the determination of the output command value of the pump 13.

When the vehicle speed exceeds the vehicle speed threshold value Vth, the controller 15 returns to the normal mode based on the relationship of the graph G1. Further, when the refrigerant temperature is lower than the temperature T1 and when the refrigerant temperature is higher than the temperature T2, the vehicle-speed-based control is not executed to prioritize the refrigerant temperature to be maintained at an appropriate temperature.

In addition to the above, the controller 15 constantly monitors whether the rotational speed of the pump 13 is deviated from a predetermined allowable range. A control by the controller 15 for monitoring the rotational speed of the pump 13 will be termed a monitoring control for easier explanation. In the monitoring control, the controller 15 is configured to measure an abnormality duration time, starting from when the rotational speed of the pump 13 is detected to have deviated from the predetermined allowable range, and during which a state of being deviated from the allowable range continues. The controller 15 outputs a notification signal for notifying an abnormality of the pump when the abnormality duration time exceeds a predetermined time threshold value. The controller 15 is provided with a counter implemented by software for measuring the abnormality duration time. The controller 15 counts up the counter on a program while the rotational speed is deviating from the allowable range. When the counter reaches a predetermined counter threshold value, the controller 15 outputs a notification (abnormality notification signal) for notifying an abnormality in the pump as a result of the abnormality duration time having exceeded the time threshold value. Specifically, the controller 15 outputs the abnormality notification signal to the instrument panel 31. The instrument panel 31 having received the abnormality notification signal turns on a lamp for notifying the abnormality, and stores a message notifying the abnormality in a diagnosis memory that is not shown. The diagnosis memory is a nonvolatile memory. Data stored in the diagnosis memory is data which a service staff refers to upon a vehicle maintenance to acknowledge a condition of the vehicle.

The aforementioned vehicle-speed-based control and monitoring control may conflict in some cases. For example, in a case where the output command value is discretely shifted by the vehicle-speed-based control during when the rotational speed of the pump 13 is deviated from the allowable range and the controller 15 is measuring the abnormality duration time, the rotational speed of the pump 13 fluctuates temporarily. Such a temporal fluctuation may accidentally bring the rotational speed to temporarily enter the allowable range. When the rotational speed temporarily enters the allowable range as above, the controller 15 determines that an abnormal state of the pump 13 has been resolved and resets the abnormality duration time (counter). Due to this, an abnormality detection of the pump 13 might thereby be delayed.

Figure 3:
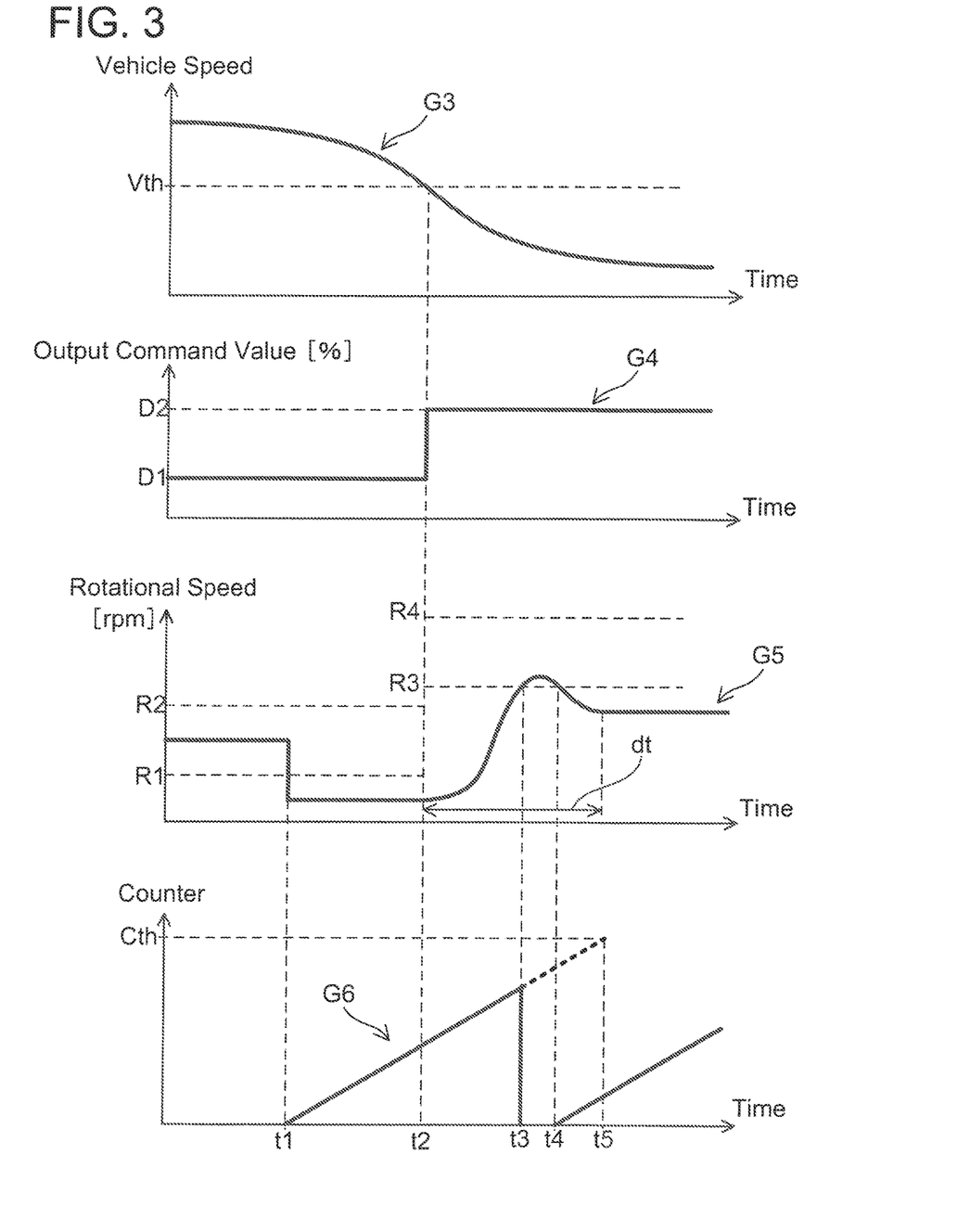
FIG. 3 is a time chart for explaining an example of a conflict between a vehicle-speed-based control and a monitoring control.

This will be described specifically using a time chart of FIG. 3. A graph G3 indicates a change in the vehicle speed. A graph G4 indicates a change in the output command value to the pump 13. A graph G5 indicates a change in the rotational speed of the pump 13. A graph G6 indicates a counter value. The counter value corresponds to the abnormality duration time.

Now, assume that the rotational speed of the pump 13 deviates from the predetermined allowable range (R1<rotational speed of the pump 13<R2) at time t1. For example, when a foreign substance tangles onto the pump 13, its rotational speed decreases. The controller 15 increments the counter at predetermined time intervals from time t1, and starts the measurement of the abnormality duration time. A counter threshold value Cth is a threshold value for determining the abnormality of the pump, and when the counter value reaches the counter threshold value Cth, the controller 15 determines that the abnormality duration time has exceeded the predetermined time threshold value and outputs the notification (abnormality notification signal) for notifying the abnormality.

According to the graph G3, the vehicle speed falls below the vehicle speed threshold value Vth at time t2. Since the vehicle speed has fallen below the vehicle speed threshold value Vth, the controller 15 discretely shifts the output command value to the pump 13 from a first command value D1 to a second command value D2 (see graph G4).

Since the output command value has been shifted discretely, the pump 13 discretely shifts the output of a motor of the pump 13 to follow the new output command value. In so doing, the rotational speed of the pump 13 fluctuates temporarily. Changing of the rotational speed in a period dt from time t2 in the graph G5 corresponds to the fluctuation of the rotational speed caused by the shifting of the output command value.

In the graph G5, a range between rotational speeds R3 and R4 corresponds to the allowable range of the rotational speed corresponding to the new output command value D2. The allowable range of the rotational speed corresponds to the output command value, and as such, the allowable range shifts when there is a shift in the output command value. A range between rotational speeds R1 and R2 is the allowable range for the output command value D1, and the range between rotational speeds R3 and R4 is the allowable range for the output command value D2.

In a period between time t3 and time t4, the rotational speed is within the allowable range due to the temporal fluctuation of the rotational speed. Thus, the controller 15 resets its counter at time t3. Then, the counter is not incremented during the period between time t3 and t4. After time t4, the rotational speed deviates out of the allowable range again, and the increment of the counter is thereby restarted.

A dotted line in the graph G6 shows the count in a case where the counter reset was not executed. The abnormality would have been notified at time t5 if the counter reset was not executed, however, since the counter reset is executed during the fluctuation, the controller 15 restarts the count from zero at time t4.

As described with reference to FIG. 3, there is a possibility of conflict between the vehicle-speed-based control and the monitoring control. The controller 15 is thus provided with a process to avoid the conflict between the vehicle-speed-based control and the monitoring control.

Figure 4:
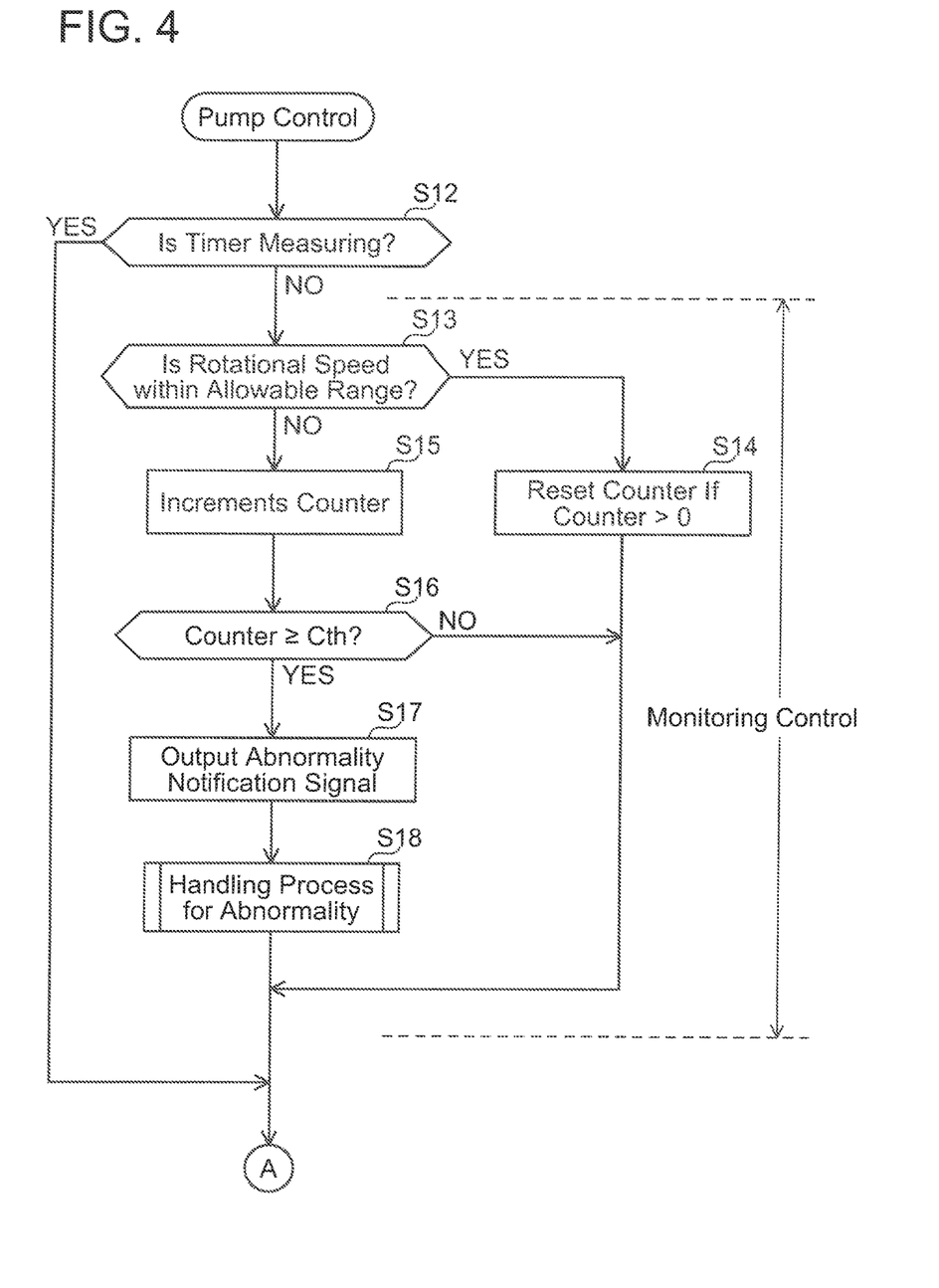
FIG. 4 is a flowchart of a pump control executed by a controller.
Figure 5:
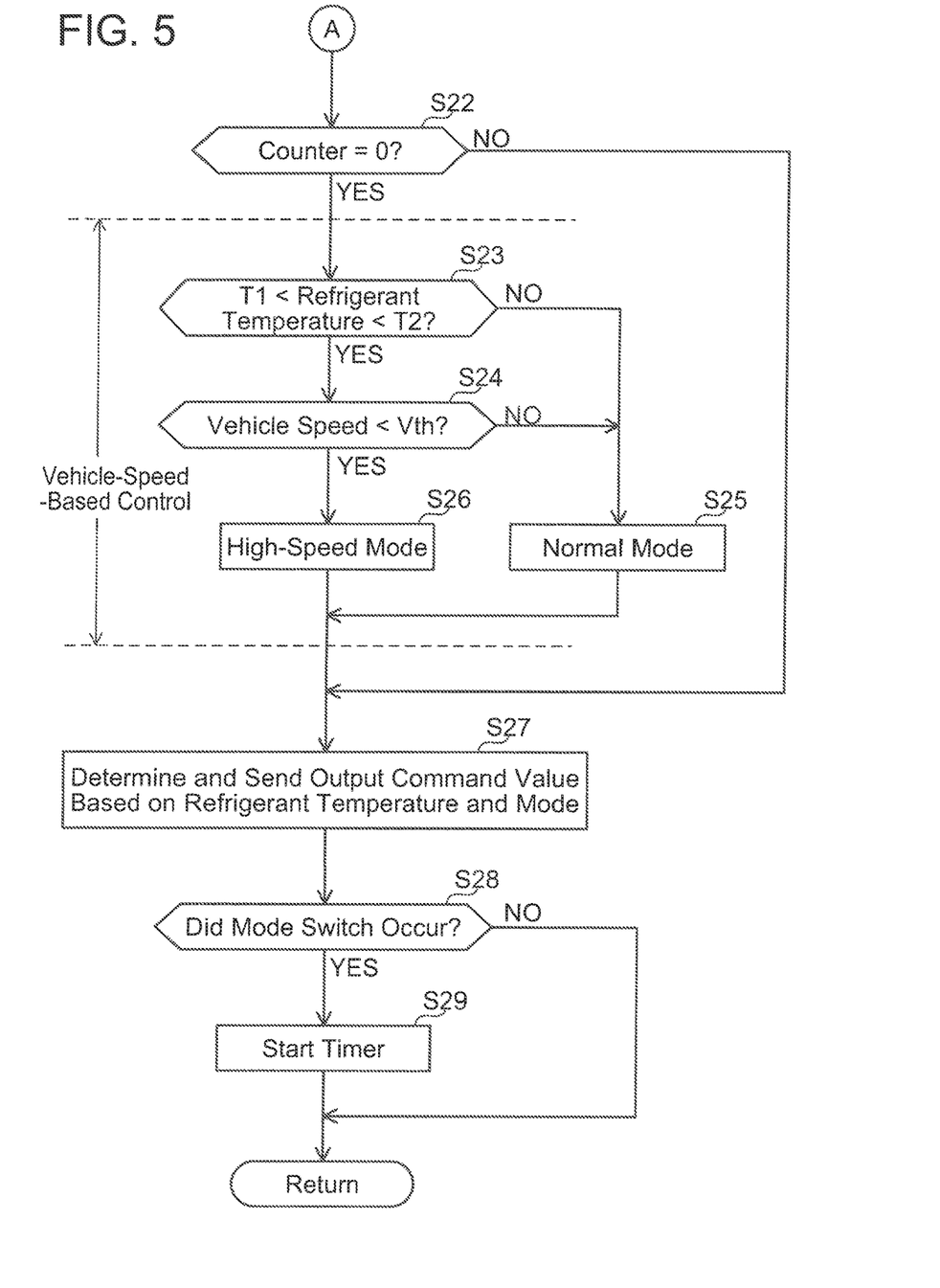
FIG. 5 is a flowchart of the pump control executed by the controller (continuation of FIG. 4).

Measures for avoiding the conflict will be described using FIGS. 4 and 5. FIGS. 4 and 5 are flowcharts of the pump control executed by the controller 15. The controller 15 executes the process of FIGS. 4 and 5 repeatedly at a predetermined control cycle.

Steps S13 to S18 correspond to the aforementioned monitoring control. Timer in step S12 will be described later.

Firstly, the controller 15 acquires the rotational speed of the pump 13 from the rotational speed sensor 16 and compares the rotational speed with data of the allowable range (step S13). If the rotational speed is within the allowable range, the controller 15 terminates the monitoring control without performing any processing therefor (step S13: YES). Here, if the counter holds a value other than zero, the controller 15 resets the counter and terminates the monitoring control (step S14).

In a case where the rotational speed is deviated from the allowable range (step S13: NO), the controller 15 increments the counter indicating the abnormality duration time (step S15). In a case where the counter has reached the counter threshold value Cth (step S16: YES), the controller 15 outputs the abnormality notification signal to the instrument panel 31 (step S17). Although detailed description will be omitted hereof the controller 15 executes a handling process corresponding to a type of the abnormality (step S18). The handling process may for example be a process of storing the message data indicating the pump abnormality in the diagnosis memory.

Subsequent to the monitoring control, the controller 15 checks the counter value (FIG. 5, step S22). In a case where the counter is zero (that is, in a case where the abnormality duration time is not being measured), the controller 15 executes the vehicle-speed-based control. Processes of steps S23 to S26 of FIG. 5 correspond to the vehicle-speed-based control. The controller 15 checks the refrigerant temperature (step S23). In a case where the refrigerant temperature is in between the temperature T1 and the temperature T2 (step S23: YES), the controller 15 then compares the vehicle speed with the vehicle speed threshold value Vth (step S24). The controller 15 selects the high-speed mode if the vehicle speed is below the vehicle speed threshold value Vth (step S24: YES, S26). The controller 15 selects the normal mode if the vehicle speed is exceeding the vehicle speed threshold value Vth (step S24: NO, S25).

Then, the controller 15 determines the output command value based on the refrigerant temperature and the selected mode and sends the same to the pump 13 (step S27). In a case where the refrigerant temperature is lower than the temperature T1 and in a case where the refrigerant temperature is higher than the temperature T2, the vehicle-speed-based control is not executed since maintaining the refrigerant temperature at an appropriate temperature is prioritized (step S23: NO, S25).

The normal mode is the control that determines the output command value of the pump 13 based on the relationship of the graph G1 in FIG. 2, and the high-speed mode is the control that determines the output command value of the pump 13 based on the relationship of the graph G2 in FIG. 2. When the vehicle speed crosses over the vehicle speed threshold value Vth, that is, when the normal mode and the high-speed mode are switched, the output command value shifts discretely. At this occasion, the conflict described with reference to FIG. 3 may occur. Thus, the controller 15 skips steps S23 to S26 in a case where the counter is other than zero in step S22 (that is, during when the measurement of the abnormality duration time is being executed). That is, the controller 15 inhibits the vehicle-speed-based control during the measurement of the abnormality duration time. By this process, the abnormality duration time can be avoided from being reset due to the discrete shifting of the output command value.

In step S28, the controller 15 checks whether or not a mode switch occurred between the normal mode and the high-speed mode (step S28). In a case where a switch between the normal mode and the high-speed mode occurred, the controller 15 starts the timer (step S28: YES, step S29). The timer is implemented in a program of the controller 15, and is configured to measure a predetermined period and thereby be terminated.

In step S12 of FIG. 4, the controller 15 is configured to skip the monitoring control when the timer is measuring (step S12: YES, S22). That is, the controller 15 temporarily stops the monitoring control during a predetermined period of time since the output command value was shifted by a discrete predetermined value (by the quantity Dd of FIG. 2) by the vehicle-speed-based control. An aim of this process will be described with reference to FIG. 6.

Figure 6:
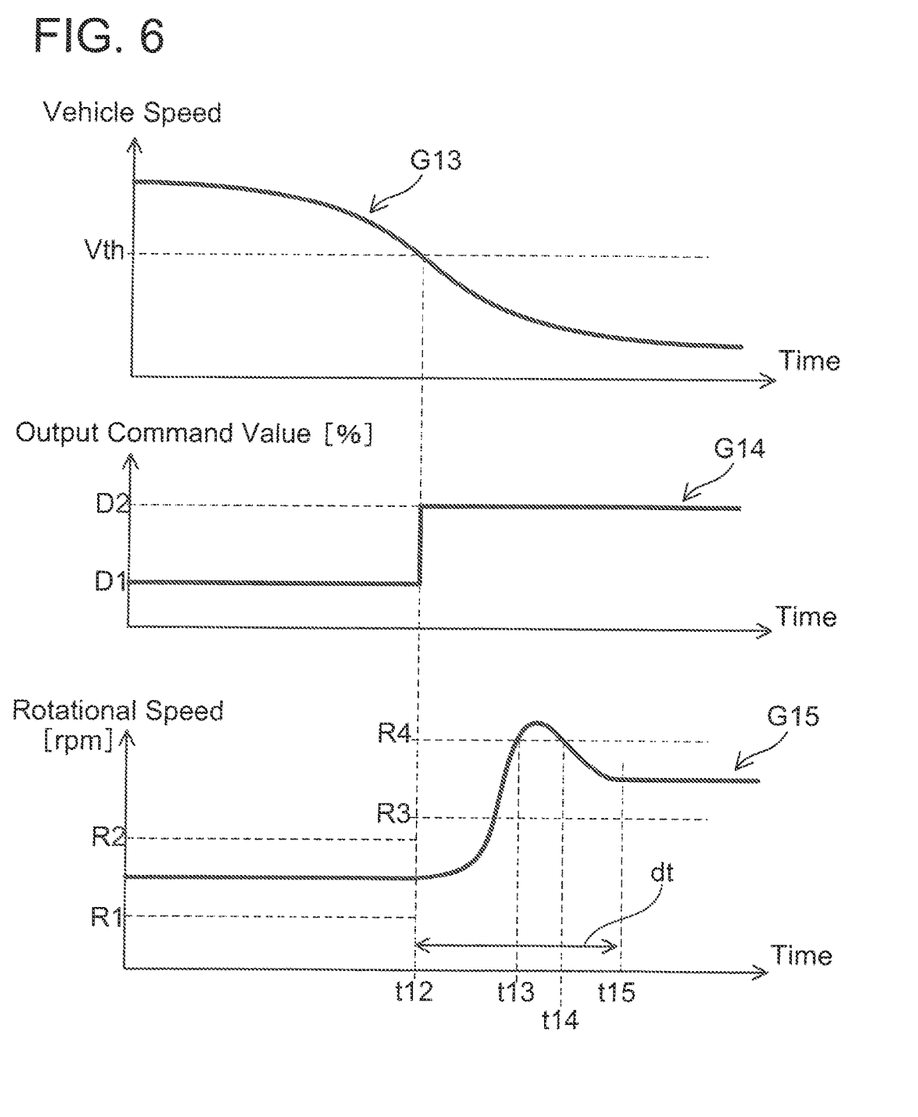
FIG. 6 is a time chart for explaining another example of the conflict between the vehicle-speed-based control and the monitoring control.

FIG. 6 is a time chart indicating the change in the rotational speed of the pump 13 when the output command value is shifted discretely by the vehicle-speed-based control. A graph G13 of FIG. 6 indicates the vehicle speed, a graph G14 indicates the shift in the output command value, and a graph G15 indicates the change in the rotational speed.

The vehicle speed falls below the vehicle speed threshold value Vth at time t12. Since the vehicle speed fell below the vehicle speed threshold value Vth, the controller 15 discretely shifts the output command value to the pump 13 from the first command value D1 to the second command value D2. The pump 13 thereby changes its output (rotational speed) from its state of following the previous output command value (first command value D1) to the state of following the new output command value (second command value D2), so the rotational speed exhibits a transitional response thereto. The allowable range of the rotational speed for the output command value D1 is the range between the rotational speeds R1 and R2, and the allowable range of the rotational speed for the output command value D2 is the range between the rotational speeds R3 and R4. In the example of FIG. 6, the rotational speed is within the allowable range until time t12.

After the output command value had shifted at time t12, the rotational speed experiences the transitional response and then stabilizes in a steady state at time t15. The rotational speed temporarily overshoots before stabilizing in the steady state. The rotational speed deviates from the allowable range (range between the rotational speeds R3 and R4) during a period from time t13 to time t14 due to the overshooting in the transitional response. Since the rotational speed is deviating from the allowable range during the period from time t13 to time t14, the controller 15 would start incrementing the counter by the monitoring control if the monitoring control is being executed during the transitional response. However, as described in connection to step S12 of FIG. 4, the controller 15 temporarily stops the monitoring control during the predetermined period of time since the output command value was discretely shifted. Here, the predetermined period of time is set to a period dt in FIG. 6, that is, to a period by which the transitional response of the rotational speed is settled. Since the controller 15 temporarily stops the monitoring control by the process of step S12 during the period dt since the output command value was discretely shifted, the measurement of the abnormality duration time is not executed even if the rotational speed is deviating from the allowable range during this period dt. Thus, an erroneous measurement of the abnormality duration time despite the pump 13 being normal can thereby be prevented.

As described above, the cooling apparatus 10 allows to avoid the conflict between the monitoring control and a vehicle-speed-based control.

Some features of the technique described in the embodiment will be described. The controller 15 is configured of a central processing unit (CPU) and a memory, and the foregoing processes are stored in the memory in advance as a program. The relationship between the refrigerant temperature and the output command value in the graph G1 (normal mode) and the relationship between the refrigerant temperature and the output command value in the graph G2 (high-speed mode) as described in FIG. 2 are also stored in the memory of the controller 15 in advance.

In the vehicle-speed-based control of the embodiment, the mode shifts from the normal mode to the high-speed mode in which the rotational speed of the pump 13 is higher than in a normal state when the vehicle speed falls below the vehicle speed threshold value Vth (step S24: YES, S26 of FIG. 5). This shifting from the normal mode to the high-speed mode aims to separate the vibration frequency of the pump 13 from the resonant frequency of the vehicle body. Depending on structures of the vehicle and the pump, the vibration frequency of the pump may be separated away from the resonant frequency of the vehicle body when the rotational speed of the pump is set lower than in the normal state. In such a case, the process of step S26 may be modified to a process of shifting to a low-rotation mode in which the pump rotational speed is lower than in the normal state. In the technique disclosed herein, the discrete shifting of the rotational speed of the pump executed when the vehicle speed falls below the vehicle speed threshold value is termed the vehicle-speed-based control.

The cooling apparatus 10 of the embodiment targets the inverter 20 as its cooling target. The technique disclosed herein is not limited to the cooling apparatus for the inverter. The cooling apparatus disclosed herein may be adapted to various types of vehicle-mounted devices. The cooling apparatus disclosed herein may be for cooling a fuel cell.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A cooling apparatus configured to cool a device mounted in a vehicle, the cooling apparatus comprising:
   a pump configured to circulate a refrigerant between the device and a radiator, and
   a controller configured to provide an output command value to the pump, and to monitor occurrence of abnormality of the pump,
   wherein
   the controller is configured capable of executing:
   vehicle-speed-based control including shifting the output command value when a vehicle speed falls below a predetermined vehicle speed threshold value; and
   monitoring control including:
      measuring an abnormality duration time during which a rotational speed of the pump is deviating from a predetermined allowable range; and
      outputting a notification signal notifying the abnormality of the pump when the measured abnormality duration time exceeds a predetermined time threshold value, and
   while the controller is measuring the abnormality duration time in the monitoring control, the controller inhibits the vehicle-speed-based control.

2. The cooling apparatus according to claim 1, wherein the controller is configured to temporarily stop the monitoring control during a predetermined period of time since the output command value has been shifted by a predetermined value in the vehicle-speed-based control.

* * * * *